United States Patent
Inada et al.

(10) Patent No.: US 9,896,963 B2
(45) Date of Patent: Feb. 20, 2018

(54) COUPLING PART STRUCTURE FOR VANE AND JET ENGINE INCLUDING THE SAME

(71) Applicants: IHI CORPORATION, Tokyo (JP); IHI AEROSPACE CO., LTD, Tokyo (JP)

(72) Inventors: Takaomi Inada, Tokyo (JP); Shinichi Tanaka, Tokyo (JP)

(73) Assignees: IHI CORPORATION, Tokyo (JP); IHI AEROSPACE CO., LTD, Tokyo (JP)

( * ) Notice: Subject to any disclaimer, the term of this patent is extended or adjusted under 35 U.S.C. 154(b) by 333 days.

(21) Appl. No.: 14/398,360

(22) Filed: Oct. 31, 2014

(65) Prior Publication Data

US 2015/0132118 A1    May 14, 2015

Related U.S. Application Data

(63) Continuation of application No. PCT/JP2013/066786, filed on Jun. 19, 2013.

(30) Foreign Application Priority Data

Jun. 20, 2012   (JP) .................................. 2012-138655

(51) Int. Cl.
  *F01D 25/00*       (2006.01)
  *F01D 9/02*        (2006.01)
  (Continued)

(52) U.S. Cl.
  CPC ........... *F01D 25/005* (2013.01); *F01D 5/282* (2013.01); *F01D 9/02* (2013.01); *F01D 25/24* (2013.01);
  (Continued)

(58) Field of Classification Search
  CPC ........ F01D 25/005; F01D 25/24; F01D 5/282; F01D 9/02; F05D 2230/644;
  (Continued)

(56) References Cited

U.S. PATENT DOCUMENTS 5,272,869 A * 12/1993 Dawson .................. F01D 9/042
  415/142
5,320,490 A *  6/1994 Corbin .................... F01D 9/042
  415/209.2

(Continued)

FOREIGN PATENT DOCUMENTS

EP   0731254 A1   9/1996
EP   1342819 A1   9/2003

(Continued)

OTHER PUBLICATIONS

Extended European Search Report mailed in corresponding European Patent Application No. 13806092.6 dated Mar. 2, 2016, consisting of 7 pp.

(Continued)

*Primary Examiner* — Aaron R Eastman
(74) *Attorney, Agent, or Firm* — Volpe and Koenig, P.C.

(57) ABSTRACT

A coupling support member including a pair of divided pieces is placed in a coupling part between a vane proximal end portion of a guide vane and an attachment flange, and the pair of divided pieces are joined to the vane proximal end portion from both the sides in the vane thickness direction. A groove is formed in one end portion joint surface of the coupling support member, a linear protrusion is formed on the other end portion joint surface, the vane proximal end portion is formed into a concavo-convex shape, a linear protrusion that is engaged with the groove which is formed in the end portion joint surface is formed on a joint surface to the one end portion joint surface, a groove that is engaged with the linear protrusion formed on the end portion joint surface is formed in the joint surface to the other end portion joint surface. The vane proximal end portion is held between the pair of divided pieces of the coupling support member, by the fastening force that is applied to the coupling support member from both the sides in the vane thickness direction.

(Continued)

It is possible to obtain a high structural strength while contributing to a reduction in weight of a jet engine.

7 Claims, 5 Drawing Sheets

(51) Int. Cl.
*F01D 5/28* (2006.01)
*F01D 25/24* (2006.01)

(52) U.S. Cl.
CPC .... *F05D 2230/644* (2013.01); *F05D 2240/12* (2013.01); *F05D 2260/31* (2013.01); *F05D 2300/44* (2013.01); *F05D 2300/603* (2013.01); *Y02T 50/672* (2013.01); *Y02T 50/673* (2013.01)

(58) Field of Classification Search
CPC ............ F05D 2240/12; F05D 2260/31; F05D 2300/44; F05D 2300/603; F04D 29/54; F04D 29/542; Y02T 50/672; Y02T 50/673
USPC .............................................. 415/200, 208.1
See application file for complete search history.

(56) References Cited

U.S. PATENT DOCUMENTS

| | | | |
|---|---|---|---|
| 5,653,580 A | 8/1997 | Faulder et al. | |
| 6,261,058 B1* | 7/2001 | Kataoka | F01D 5/288 415/189 |
| 7,905,448 B2* | 3/2011 | Sjunnesson | F01D 25/28 244/54 |
| 2007/0086854 A1 | 4/2007 | Blanton | |
| 2009/0010755 A1* | 1/2009 | Keller | F01D 21/045 415/197 |
| 2009/0191053 A1 | 7/2009 | Bridge et al. | |
| 2009/0225452 A1* | 9/2009 | Wu | G02B 13/001 359/824 |
| 2010/0111685 A1 | 5/2010 | Sjunnesson et al. | |
| 2010/0189562 A1* | 7/2010 | Blanchard | B29D 99/0025 416/219 R |
| 2011/0008163 A1 | 1/2011 | Prentice | |
| 2011/0299917 A1* | 12/2011 | Samuelsson | F01D 5/30 403/223 |
| 2012/0051923 A1* | 3/2012 | McDonald | F01D 9/042 416/219 R |
| 2013/0156590 A1* | 6/2013 | Blanchard | F01D 5/3069 416/220 R |
| 2016/0108744 A1* | 4/2016 | Locatelli | F01D 5/147 416/214 A |

FOREIGN PATENT DOCUMENTS

| | | |
|---|---|---|
| EP | 1548233 A1 | 6/2005 |
| EP | 2213839 A2 | 8/2010 |
| FR | 2958680 A1 | 10/2011 |
| JP | 4-044404 U | 4/1992 |
| JP | 08-246804 A | 9/1996 |
| JP | 2008-534837 A | 8/2008 |
| RU | 40655 | 9/2004 |
| WO | 2008121047 A1 | 10/2008 |

OTHER PUBLICATIONS

Office Action mailed in corresponding Russian Patent Application No. 2015101531/06(002257) dated Mar. 4, 2016, consisting of 16 pp. (English Translation Provided).

Written Opinion and International Search Report mailed in corresponding International Patent Application No. PCT/JP2013/066786 dated Aug. 13, 2013, consisting of 8 pp. (English Translation Provided).

* cited by examiner

COUPLING PART STRUCTURE FOR VANE AND JET ENGINE INCLUDING THE SAME

RELATED APPLICATION

This application is a continuation of International Application No. PCT/JP2013/066786 filed on Jun. 19, 2013 that is incorporated herein by reference as fully set forth.

TECHNICAL FIELD

The present invention relates to, for example, a coupling part structure for a vane used for a coupling part to an engine main body, of guide vanes that are vanes constituting an aircraft jet engine, and a jet engine including the coupling part structure for the vane.

BACKGROUND ART

Such a jet engine as described above is normally provided with: rotor blades for introducing air into an engine main body; and guide vanes that are stator vanes for controlling a flow of the air introduced by the rotor blades.

The guide vanes may be required to have only the flow controlling function, and may be required to also have a structural function of coupling a fan frame and a fan case constituting the engine main body, in addition to the flow controlling function.

In the former case where the guide vanes are required to have only the flow controlling function, a metal material such as an aluminum alloy or a composite material of thermosetting resin such as epoxy resin and reinforcement fiber such as carbon fiber is normally adopted as the constituent material of each guide vane, and a strut that is placed downstream of the guide vanes and is made of a metal material such as an aluminum alloy as its constituent material is provided with the structural function. Meanwhile, in the case where the guide vanes are required to also have the structural function in addition to the flow controlling function, a metal material such as an aluminum alloy is adopted as the constituent material of each guide vane.

Such guide vanes as described above and a jet engine including the guide vanes are described in, for example, Patent Documents 1 to 3.

PRIOR ART DOCUMENT

Patent Document

Patent Document 1: U.S. Pat. No. 5,320,490
Patent Document 2: Japanese Patent No. 2766423
Patent Document 3: Japanese Patent Laid-Open No. 05-149148

SUMMARY OF THE INVENTION

Problems to be Solved by the Invention

Here, in response to a demand of recent years for a higher bypass ratio for the purpose of enhancing the fuel efficiency of an aircraft jet engine, the engine diameter tends to be made larger. Along with this, the weight of the aircraft jet engine needs to be urgently reduced.

For example, in the case where the guide vanes are provided with only the flow controlling function, the weight of each guide vane itself can be reduced by an amount corresponding to using the composite material as its constituent material, whereas the reduction in weight of the aircraft jet engine is prevented by an amount corresponding to assigning the structural function to the strut that is made of the metal material such as the aluminum alloy as its constituent material.

On the other hand, in the case where the guide vanes are provided with the structural function in addition to the flow controlling function, the metal material such as the aluminum alloy is used as the constituent material of each guide vane, and hence the reduction in weight of the aircraft jet engine is prevented, which is the same problem as that in the case of using the strut. This is a conventional problem to be solved.

The present invention, which has been made in view of the above-mentioned conventional problem, has an object to provide a coupling part structure for a vane capable of obtaining a high structural strength while contributing to a reduction in weight of a jet engine, and a jet engine including the coupling part structure for the vane.

Means for Solving the Problems

In order to achieve the above described object, the present invention provides a coupling part structure for a vane that constitutes a jet engine and is made of a composite material of thermosetting resin or thermoplastic resin and reinforcement fiber, the coupling part structure comprising a vane coupling part, wherein the vane coupling part includes a coupling support member placed therein, the coupling support member being made of metal and including a pair of divided pieces separated from each other, the pair of divided pieces being joined to an end portion of the vane from both sides in a vane thickness direction, on an either one of respective end joint surfaces of the pair of divided pieces of the coupling support member, a linear protrusion is formed in an axis direction of the jet engine, and in the other end joint surface, a groove is formed in the axis direction of the jet engine to face the linear protrusion, the end portion of the vane is formed into a concavo-convex shape in a state with a constant vane thickness in a radial direction of the jet engine, the end portion of the vane has a groove that is engaged with the linear protrusion which is formed on the one end joint surface of either one of the pair of divided pieces, in either one joint surface of joint surfaces to the pair of divided pieces, and has a linear protrusion that is engaged with the groove which is formed in the end joint surface of the other one of the pair of divided pieces, on the other joint surface and at a back side position of the groove in the either one joint surface, and the end portion of the vane is held between the pair of divided pieces of the coupling support member, by fastening force that is applied to the pair of divided pieces of the coupling support member from both the sides in the vane thickness direction.

Preferably, an adhesive is interposed between the pair of divided pieces of the coupling support member and the end portion of the vane held between the pair of divided pieces.

The vane is preferably a stator vane of the jet engine.

The present invention further provides a jet engine including the above-mentioned coupling part structure for the vane as a coupling part structure for a vane constituting the jet engine.

Here, the coupling part structure for the vane according to the present invention can be applied to: a coupling part between a vane distal end portion of a guide vane that is a stator vane of a jet engine and an engine main body; and a coupling part between a vane proximal end portion of, similarly, the guide vane and the engine main body, and can also be applied to: a coupling part between a tip (distal end portion) of a rotor blade of the jet engine and a tip shroud; and a coupling part between a hub (proximal end portion) of, similarly, the rotor blade and a shaft. Note that the tip shroud is provided to the tip of the rotor blade for the purpose of vibration prevention and aerodynamic performance improvement, and rotates together with the rotor blade.

In the coupling part structure for the vane according to the present invention, the linear protrusions or grooves formed on the end joint surface(s) of the coupling support member (the grooves or linear protrusions formed on the joint surface(s) of the end portion of the vane to the coupling support member) can be trapezoidal, semicircular, triangular, and rectangular in cross-section, but are not limited to these shapes.

Further, in the coupling part structure for the vane according to the present invention, examples of the thermosetting resin usable to form the vane include epoxy resin, phenolic resin, and polyimide resin, and examples of the thermoplastic resin usable to form, similarly, the vane include polyetherimide, polyether ether ketone, and polyphenylene sulfide. Then, examples of the reinforcement fiber usable to form the vane include carbon fiber, aramid fiber, and glass fiber. The vane is formed by, for example, laminating the composite material of these substances in the vane thickness direction or three-dimensionally inweaving the composite material thereof. Meanwhile, metal such as an aluminum alloy and a titanium alloy can be used to form the coupling support member.

In the coupling part structure for the vane according to the present invention, first, the end portion of the vane made of the composite material is located between the pair of divided pieces of the coupling support member made of the metal. Further, the groove which is formed in either one joint surface to the coupling support member in the end portion of the vane is engaged with the linear protrusions which is formed on either one end joint surface of the coupling support member, and the linear protrusions which is formed on the other joint surface to the coupling support member in the end portion of the vane is engaged with the groove which is formed in the other end joint surface of the coupling support member. In this state, for example, the fastening force obtained by the bolts and the nuts is applied to the pair of divided pieces of the coupling support member from both the sides in the vane thickness direction, whereby the end portion of the vane is held between the pair of divided pieces of the coupling support member.

Accordingly, the coupling part structure for the vane according to the present invention is capable of obtaining a high structural strength while contributing to a reduction in weight of the jet engine. In addition, because the coupling strength is a mechanical coupling strength, process management for the coupling part is facilitated compared with the coupling strength in the case of using only an adhesive, for example.

Further, because the end portion of the vane is sandwiched between the pair of divided pieces from both the sides in the vane thickness direction, a turn of the end portion of the vane can be avoided compared with, for example, the case where the end portion of the vane is supported by only one of the divided pieces. As a result, a strong coupling state can be maintained.

Moreover, at the time of assembling of the end portion of the vane and the coupling support member, the groove and the linear protrusion in the end portion of the vane is engaged with the linear protrusion and the groove in the coupling support member, whereby the two components are positioned with each other. Accordingly, this assembling work is facilitated.

Furthermore, the end portion of the vane is formed into a concavo-convex shape while the vane thickness is kept constant in the radial direction of the jet engine, that is, the groove and the linear protrusion on the vane end portion side are formed by continuous fiber, and therefore, strength can be kept or improved without increasing the number of process steps.

Still further, in the coupling part structure for the vane according to the present invention, if the adhesive is interposed between the pair of divided pieces of the coupling support member and the end portion of the vane held between the pair of divided pieces, a higher structural strength can be obtained, and if the vane is a stator vane of the jet engine, for example, the guide vane, the flow controlling function as required is exhibited.

Here, in the end portion of the vane, a groove and a linear protrusion can be continuously formed on either one joint surface of the joint surfaces to the pair of divided pieces, and a linear protrusion and a groove can be continuously formed on the other joint surface of the joint surfaces to the pair of divided pieces and at respective back side positions of the groove and the linear protrusion in the either one joint surface.

Furthermore, in the end portion of the vane, two grooves can be formed with a space therebetween, for example, in either one joint surface, while two linear protrusions can be formed on the other joint surface and at respective back side positions of the two grooves in the either one joint surface, and if these configurations are adopted, the structural strength is increased more correspondingly to an amount of increase of an adhesion area.

Meanwhile, the jet engine according to the present invention adopts the coupling part structure for the vane according to the present invention, to thereby achieve both a reduction in weight and an increase in strength.

Advantageous Effects of the Invention

A coupling part structure for a vane according to the present invention produces an excellent effect of obtaining a high structural strength while contributing to a reduction in weight of a jet engine.

MODE FOR CARRYING OUT THE INVENTION

Hereinafter, the present invention is described with reference to the drawings.

FIG. 1 to FIG. 4 illustrate one embodiment of a coupling part structure for a vane according to the present invention, and a coupling part of each guide vane as a stator vane constituting a jet engine is described as an example in this embodiment.

Figure 1:
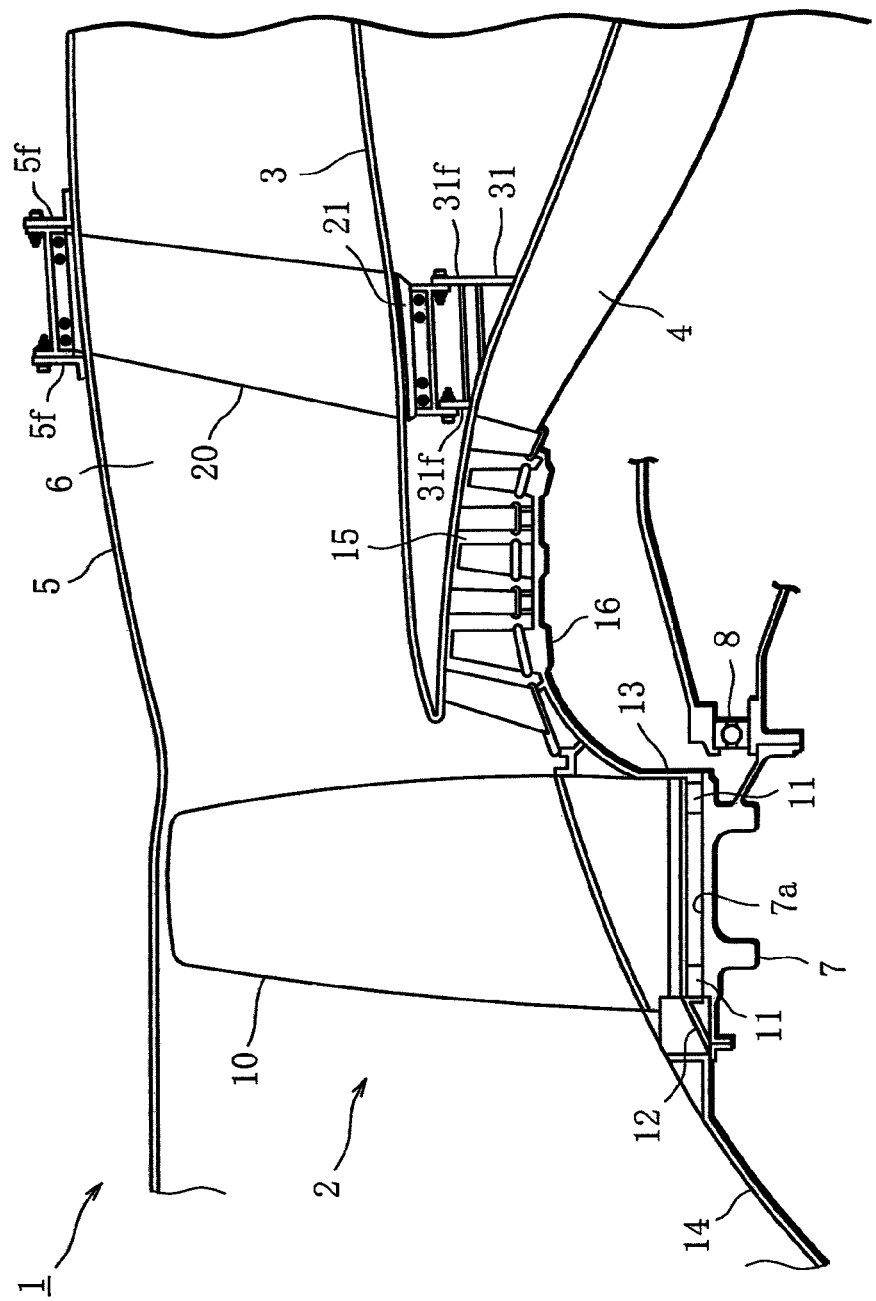
FIG. 1 is an explanatory partial cross-sectional view of a front upper portion of a jet engine to which a coupling part structure for a vane according to one embodiment of the present invention is applied.

As illustrated in FIG. 1, in a jet engine 1, an annular core flow passage 4 is formed on a shaft core side of an engine inner cylinder 3 of an engine main body 2, and a bypass flow passage 6 is formed between the inner circumferential surface of a fan case 5 and the outer circumferential surface of the engine inner cylinder 3 corresponding to an outer portion of the engine main body 2.

In a front portion (on the left side of FIG. 1) of the jet engine 1, a fan disc 7 is rotatably set around the engine shaft core (not illustrated) with the intermediation of a bearing 8. The fan disc 7 is integrally coupled to a turbine rotor of a low-pressure turbine (not illustrated) placed in a back portion (on the right side of FIG. 1) of the jet engine 1.

Further, on the outer circumferential surface of the fan disc 7, a plurality of rotor blades 10 are placed at regular intervals in the circumferential direction with the intermediation of fitting grooves 7a, and spacers 11, 11 are respectively placed in a front portion and a back portion between each rotor blade 10 and each fitting groove 7a. Annular retainers 12, 13 that support the rotor blades 10 are respectively integrally set in the circumferential direction in a front portion and a back portion of the fan disc 7. The retainer 12 in the front portion is integrally coupled to a nose cone 14, and the retainer 13 in the back portion is coaxially and integrally coupled to a rotor 16 of a low-pressure compressor 15 that is adjacently placed downstream of the fan disc 7.

Note that tip shrouds for vibration prevention and aerodynamic performance improvement are respectively coupled between the tips of the plurality of rotor blades 10, and the tip shrouds are not illustrated in FIG. 1.

That is, when the jet engine 1 is operated, the plurality of rotor blades 10 are rotated together with the fan disc 7, whereby air can be introduced into the core flow passage 4 and the bypass flow passage 6.

The jet engine 1 includes a plurality of guide vanes (stator vanes) 20 on the bypass flow passage 6. The plurality of guide vanes 20 are placed at regular intervals around the engine inner cylinder 3, and regulate a swirling flow of air flowing in the bypass flow passage 6. A composite material of: thermosetting resin (such as epoxy resin, phenolic resin, and polyimide resin) or thermoplastic resin (such as polyetherimide, polyether ether ketone, and polyphenylene sulfide); and reinforcement fiber (such as carbon fiber, aramid fiber, and glass fiber) is used as the constituent material of each guide vane 20. The guide vane 20 is formed by, for example, laminating the constituent material in the vane thickness direction or three-dimensionally in weaving the constituent material.

A vane proximal end portion (vane end portion) 21 on a shaft core side of each guide vane 20 is coupled to an attachment flange 31f of a fan frame 31 placed on the engine inner cylinder 3, and a vane distal end portion (vane end portion) 22 on a side farther from the shaft core of the guide vane 20 is coupled to an attachment flange 5f placed on the fan case 5.

Figure 2:
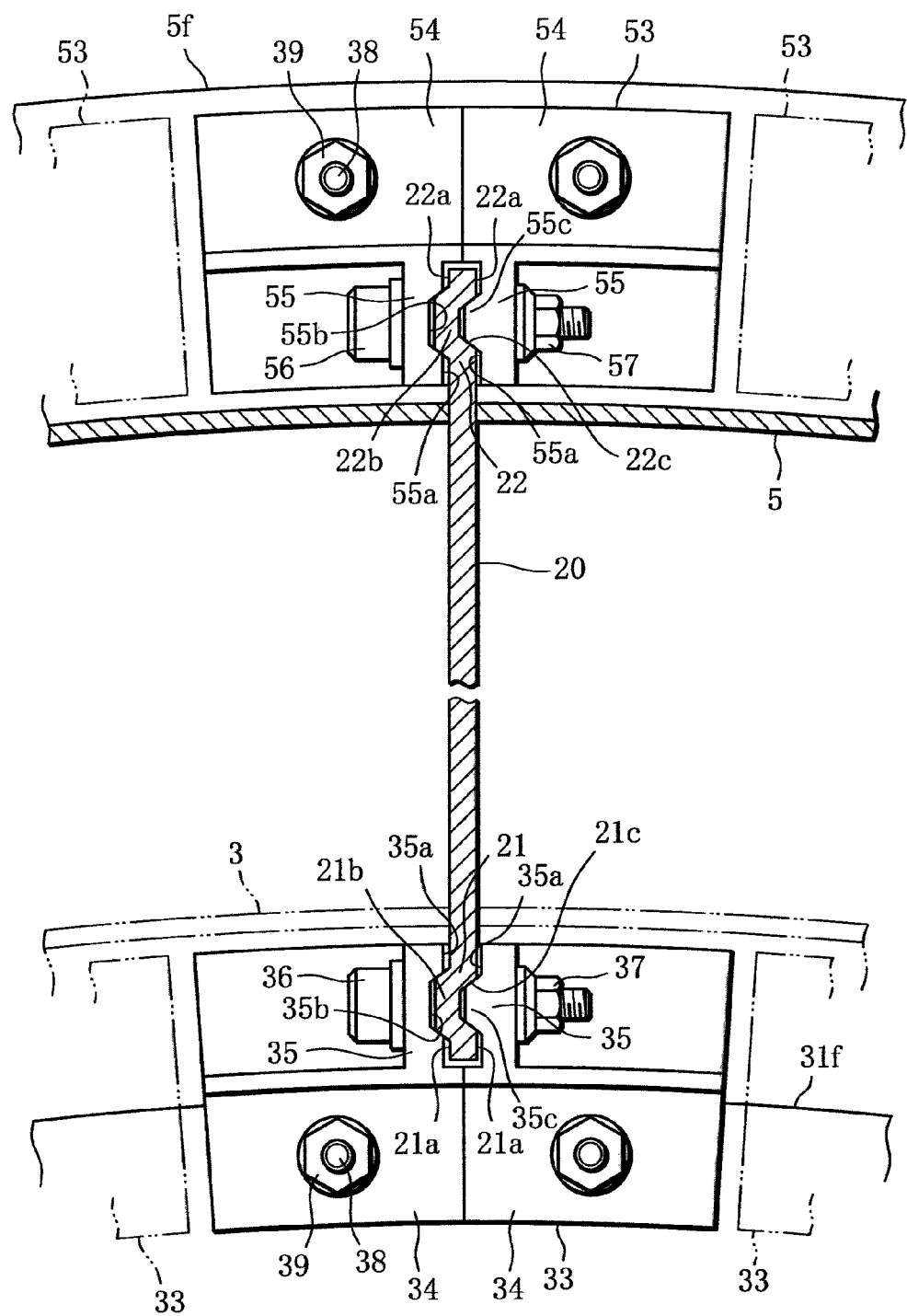
FIG. 2 is an explanatory cross-sectional view of a vane coupling part, FIG. 2 illustrating in detail the coupling part structure for the vane in FIG. 1, the jet engine being observed on its front side.
Figure 4:
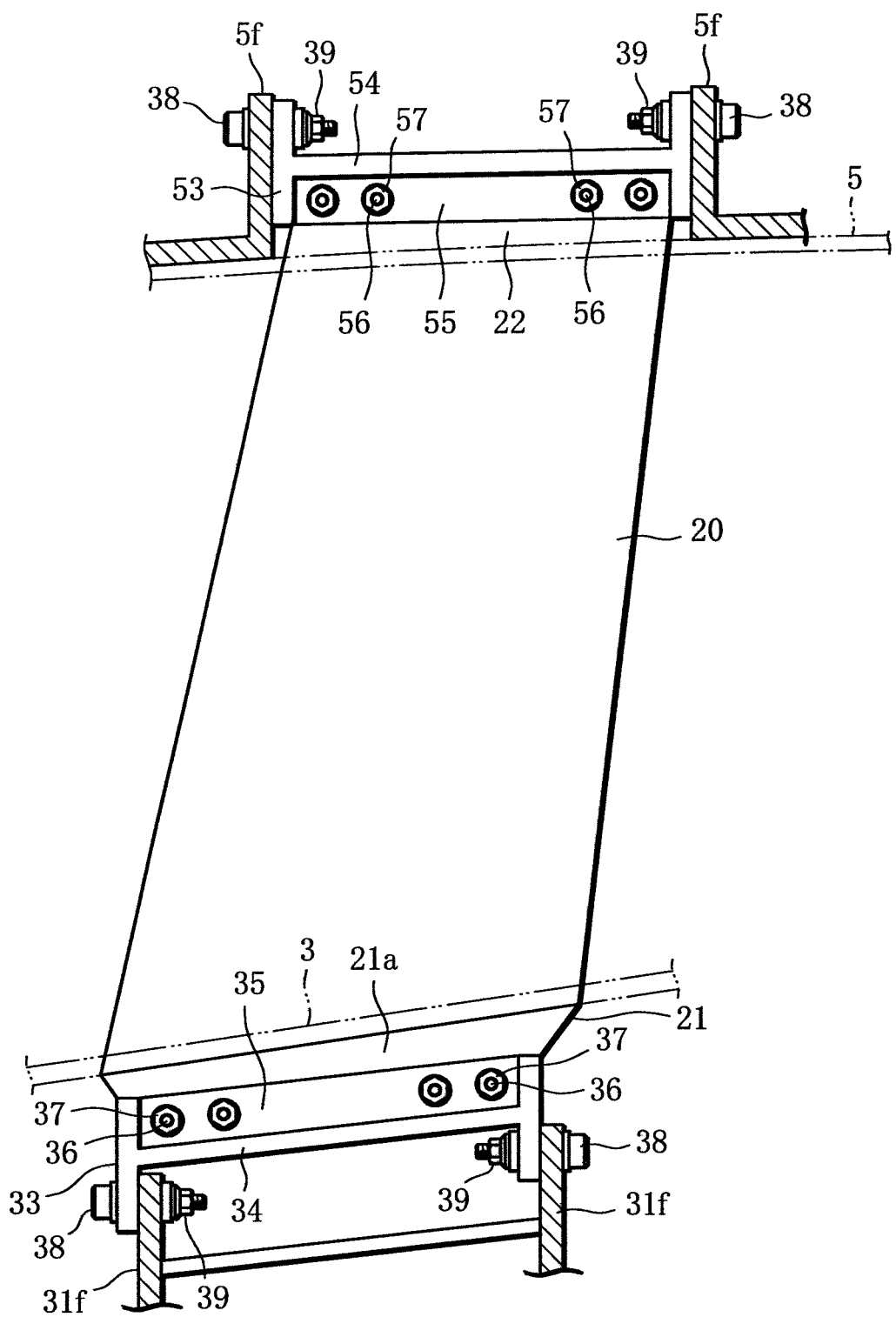
FIG. 4 is an explanatory side view of the vane coupling part, FIG. 4 illustrating in detail the coupling part structure for the vane in FIG. 1.

In this case, as illustrated in FIG. 2 and FIG. 4, a coupling support member 33 including a pair of divided pieces 34, 34 separated from each other is placed in a coupling part between the vane proximal end portion 21 of the guide vane 20 and the attachment flange 31f, namely, a vane coupling part, and the pair of divided pieces 34, 34 are joined to the vane proximal end portion 21 of the guide vane 20 from both the sides in the vane thickness direction (the left-right direction in FIG. 2). Each of the divided pieces 34, 34 of the coupling support member 33 is made of metal such as an aluminum alloy and a titanium alloy, and is attached to the attachment flange 31f using a bolt 38 and a nut 39.

Opposed walls 35 facing each other are respectively formed on the pair of divided pieces 34, 34 of the coupling support member 33, and the opposed walls 35, 35 are joined to the vane proximal end portion 21 of the guide vane 20 from both the sides in the vane thickness direction.

Here, in a divided piece 34 at a left side of FIG. 2 of the two divided pieces 34, 34 which configure the coupling support member 33, that is, in an end joint surface 35a of the opposed wall 35 in the divided piece 34 at the left side of FIG. 2, a groove 35b having a section forming a trapezoidal shape is formed in an engine axis direction, and in the divided piece 34 at a right side of FIG. 2 of the two divided pieces 34, 34, that is, in an end joint surface 35a of the opposed wall 35 in the divided piece 34 at the right side of FIG. 2, a linear protrusion 35c having a section forming a trapezoidal shape is formed to face the groove 35b.

Figure 3:
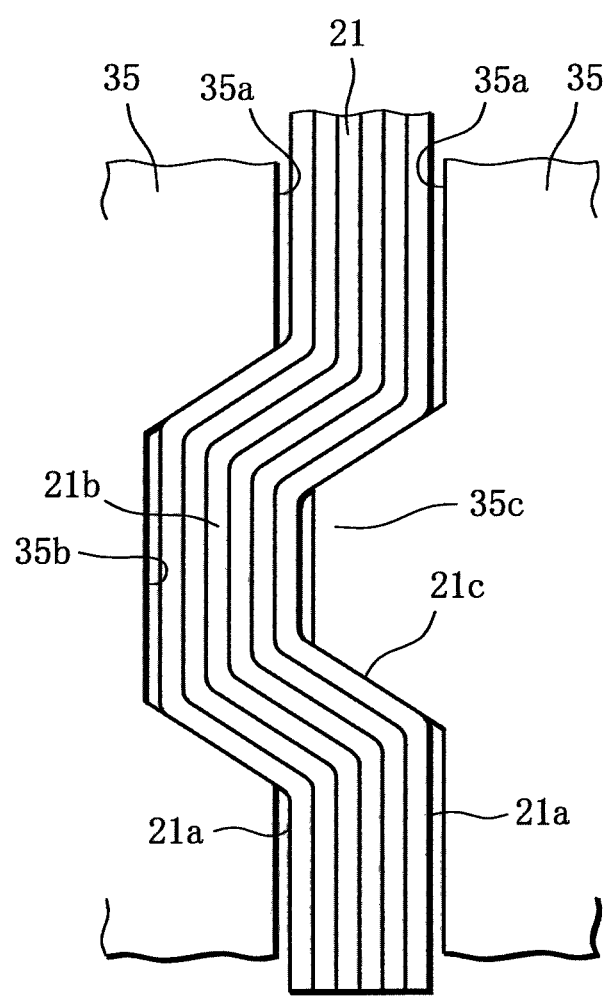
FIG. 3 is an enlarged sectional explanatory view in a vane proximal end portion of the vane coupling part shown in FIG. 2.

Meanwhile, as is also shown in FIG. 3, the vane proximal end portion 21 of the guide vane 20 is formed into a concavo-convex shape in a state with a constant vane thickness in a radial direction of the engine, and on a joint surface 21a at the left side of FIG. 2 of the joint surfaces 21a, 21a in the vane proximal end portion 21 of the guide vane 20, a linear protrusion 21b that mutually engages with the groove 35b which is formed in the end joint surface 35a in the divided piece 34 at the left side of FIG. 2 is formed, and a groove 21c that mutually engages with the linear protrusion 35c which is formed on the end joint surface 35a in the divided piece 34 at the right side of FIG. 2 is formed on the joint surface 21a at the right side of FIG. 2 of the joint surfaces 21a, 21a and at a back side position of the linear protrusion 21b in the joint surface 21a at the left side of FIG. 2.

Then, in this embodiment, the vane proximal end portion 21 of the guide vane 20 is held between the respective opposed walls 35, 35 of the pair of divided pieces 34, 34 by the fastening force that is applied by a bolt 36 and a nut 37 to the pair of divided pieces 34, 34 of the coupling support member 33 from both the sides in the vane thickness direction.

Further, in this embodiment, an adhesive is interposed between the respective opposed walls 35, 35 of the pair of divided pieces 34, 34 of the coupling support member 33 and the vane proximal end portion 21 of the guide vane 20 held between the opposed walls 35, 35.

Meanwhile, a coupling support member 53 including a pair of divided pieces 54, 54 separated from each other is placed also in a coupling part between the vane distal end portion 22 of the guide vane 20 and the attachment flange 5f, namely, a vane coupling part, and the pair of divided pieces 54, 54 are joined to the vane distal end portion 22 of the guide vane 20 from both the sides in the vane thickness direction (the left-right direction in FIG. 2). Each of the divided pieces 54, 54 of the coupling support member 53 is made of metal such as an aluminum alloy and a titanium alloy, and is attached to the attachment flange 5f using the bolt 38 and the nut 39.

Opposed walls 55, 55 facing each other are respectively formed also on the pair of divided pieces 54, 54 of the coupling support member 53, and the opposed walls 55, 55 are joined to the vane distal end portion 22 of the guide vane 20 from both the sides in the vane thickness direction.

Also in this vane coupling part, in a divided piece 54 at a left side of FIG. 2 of the two divided pieces 54, 54 which configure the coupling support member 53, that is, in an end joint surface 55a of the opposed wall 55 in the divided piece 54 at the left side of FIG. 2, a groove 55b having a section forming a trapezoidal shape is formed in an engine axis direction, and in the divided piece 54 at a right side of FIG. 2 of the two divided pieces 54, 54, that is, in an end joint surface 55a of the opposed wall 55 in the divided piece 54 at the right side of FIG. 2, a linear protrusion 55c having a section forming a trapezoidal shape is formed to face the groove 55b.

Meanwhile, the vane distal end portion 22 of the guide vane 20 is formed into a concavo-convex shape in a state with a constant vane thickness in the radial direction of the engine, and on a joint surface 22a at the left side of FIG. 2 of the joint surfaces 22a and 22a in the vane distal end portion 22 of the guide vane 20, a linear protrusion 22b that mutually engages with the groove 55b which is formed in the end portion joint surface 55a in the divided piece 54 at the left side of FIG. 2 is formed, and a groove 22c that mutually engages with the linear protrusion 55c which is formed on the end portion joint surface 55a in the divided piece 54 at the right side of FIG. 2 is formed on the joint surface 22a at the right side of FIG. 2 of the joint surfaces 22a, 22a, and at a back side position of the linear protrusion 22b in the joint surface 22a at the left side of FIG. 2.

Then, the vane distal end portion 22 of the guide vane 20 is held between the respective opposed walls 55, 55 of the pair of divided pieces 54, 54 by the fastening force that is applied by a bolt 56 and a nut 57 to the pair of divided pieces 54, 54 of the coupling support member 53 from both the sides in the vane thickness direction.

Further, also in this vane coupling part, an adhesive is interposed between the respective opposed walls 55, 55 of the pair of divided pieces 54, 54 of the coupling support member 53 and the vane distal end portion 22 of the guide vane 20 held between the opposed walls 55, 55.

As described above, in the coupling part structure for the vane according to this embodiment, first, the vane proximal end portion 21 of each guide vane 20 made of the composite material is located between the respective opposed walls 35, 35 of the pair of divided pieces 34, 34 of the coupling support member 33 made of the metal.

Further, the linear protrusion 21b formed on the joint surface 21a on the left side of FIG. 2 of the vane proximal end portion 21 is engaged with the groove 35b formed on the joint surface 35a on the left side of FIG. 2 of the coupling support member 33, and the groove 21c formed on the joint surface 21a on the right side of FIG. 2 of the vane proximal end portion 21 is engaged with the linear protrusion 35c formed on the joint surface 35a on the right side of FIG. 2 of the coupling support member 33.

In this state, the fastening force obtained by the bolts 36 and the nuts 37 is applied to the pair of divided pieces 34, 34 of the coupling support member 33 from both the sides in the vane thickness direction, whereby the vane proximal end portion 21 is held between the respective opposed walls 35, 35 of the pair of divided pieces 34, 34.

Similarly, the vane distal end portion 22 of each guide vane 20 is located between the respective opposed walls 55, 55 of the pair of divided pieces 54, 54 of the coupling support member 53 made of the metal. Further, the linear protrusion 22b formed on the joint surface 22a on the left side of FIG. 2 of the vane distal end portion 22 is engaged with the groove 55b formed on the joint surface 55a on the left side of FIG. 2 of the coupling support member 53, and the groove 22c formed on the joint surface 22a on the right side of FIG. 2 of the vane distal end portion 22 is engaged with the linear protrusion 55c formed on the joint surface 55a on the right side of FIG. 2 of the coupling support member 53. In this state, the fastening force obtained by the bolts 56 and the nuts 57 is applied to the pair of divided pieces 54, 54 of the coupling support member 53 from both the sides in the vane thickness direction, whereby the vane distal end portion 22 is held between the respective opposed walls 55, 55 of the pair of divided pieces 54, 54.

Accordingly, the coupling part structure for the vane according to this embodiment is capable of obtaining a high structural strength while contributing to a reduction in weight of the jet engine 1. In addition, because the coupling strength is a mechanical coupling strength, process management for the coupling part is facilitated compared with the coupling strength in the case of using only an adhesive, for example.

Further, because the vane proximal end portion 21 (vane distal end portion 22) is sandwiched between the respective opposed walls 35, 35 (55, 55) of the pair of divided pieces 34, 34 (54, 54) from both the sides in the vane thickness direction, a turn of the vane proximal end portion 21 (the vane distal end portion 22) can be avoided compared with, for example, the case where the vane proximal end portion 21 (the vane distal end portion 22) is supported by a wall on one side. As a result, a strong coupling state can be maintained.

Moreover, at the time of assembling of the vane proximal end portion 21 (the vane distal end portion 22) and the coupling support member 33 (53), the groove 21c (22c) and the linear protrusion 21b (22b) of the vane proximal end portion 21 (the vane distal end portion 22) are respectively engaged with the linear protrusion 35c (55c) and the groove 35b (55b) of the coupling support member 33 (53), whereby the two components are positioned with each other. Accordingly, this assembling work is facilitated.

Furthermore, the vane proximal end portion 21 (the vane distal end portion 22) is formed into a concavo-convex shape while keeping the vane thickness constant in the radial direction of the engine, that is, the groove 21c (22c) and the linear protrusion 21b (22b) on the vane proximal end portion 21 (the vane distal end portion 22) side are molded by continuous fiber, and therefore, strength can be kept or improved without increasing the number of process steps.

Still further, in the coupling part structure for the vane according to this embodiment, the adhesive is interposed between the respective opposed walls 35, 35 (55, 55) of the pair of divided pieces 34, 34 (54, 54) of the coupling support member 33 (53) and the vane proximal end portion 21 (the vane distal end portion 22) of the guide vane 20 held between the opposed walls 35, 35 (55, 55), and hence a higher structural strength can be obtained. In this embodiment, the vane is the guide vane 20 as a stator vane of the jet engine 1, and therefore, the original flow controlling function of the guide vane 20 is exhibited.

Then, the jet engine according to this embodiment adopts the above-mentioned coupling part structure for the vane, and thus achieves both a reduction in weight and an increase in strength.

In the above-mentioned embodiments, description is given of an example case where the coupling part structure for the vane according to the present invention is applied to the vane coupling part of each guide vane as the stator vane of the jet engine, but the present invention is not limited thereto. For example, as illustrated in FIG. 5, the coupling part structure for the vane according to the present invention can also be applied to a coupling part between: a tip (distal end portion) 62 of each rotor blade 60 of the jet engine; and a tip shroud 85 that is provided to the tip 62 for the purpose of vibration prevention and aerodynamic performance improvement and rotates together with the rotor blade 60.

Figure 5:
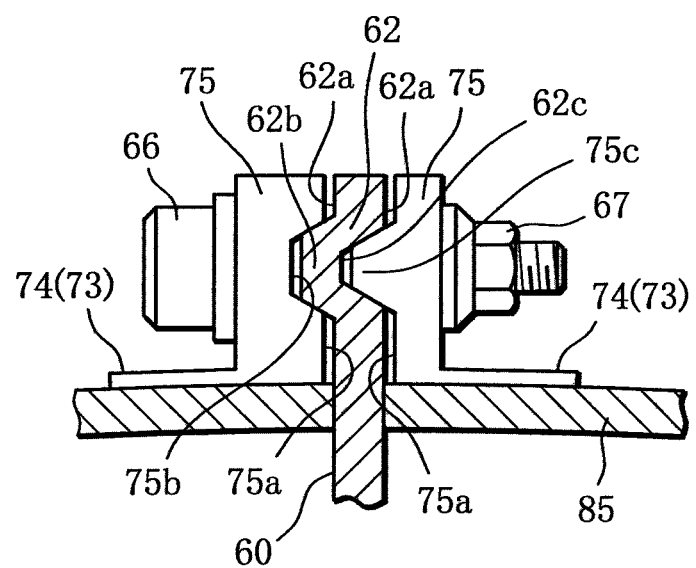
FIG. 5 is an explanatory partial cross-sectional view of a coupling part between a tip of a rotor blade and a tip shroud, FIG. 5 illustrating in detail a coupling part structure for a vane according to still another embodiment of the present invention.

That is, in this embodiment, in a joint surface 75a at the left side of FIG. 5 of respective joint surfaces 75a, 75a in a pair of divided pieces 74, 74 of a link support body 73, a groove 75b having a section forming a trapezoidal shape is formed, and on a joint surface 75a at the right side of FIG. 5 of the respective joint surfaces 75a, 75a, a linear protrusion 75c is formed to face the groove 75b.

Meanwhile, the tip 62 of the rotor blade 60 is formed into a concavo-convex shape, and on a joint surface 62a at the left side of FIG. 5 of the joint surfaces 62a, 62a in the tip 62 of the rotor blade 60, a linear protrusion 62b that engages with the groove 75b which is formed in the joint surface 75a in the divided piece 74 at the left side of FIG. 5 is formed, and a groove 62c that mutually engages with the linear protrusion 75c which is formed on the joint surface 75a in the divided piece 74 at the right side of FIG. 5 is formed, on the joint surface 62a at the right side of FIG. 5 of the joint surfaces 62a, 62a.

In this way, the coupling part structure for the vane according to the above-mentioned embodiment is also capable of obtaining a higher structural strength while contributing to the reduction in weight of the jet engine.

While in the respective embodiments described above, the linear protrusions 21b, 22b, 62b and the grooves 21c, 22c, 62c on the vane end portion side, and the grooves 35b, 55b, 75b and the linear protrusions 35c, 55c, 75c on the coupling support member side all form trapezoidal shapes in section, the present invention is not limited thereto, and the linear protrusions and the grooves which have the sections forming semicircular shapes, forming triangular shapes, or forming rectangular shapes can be adopted, as the linear protrusions and the grooves.

Further, while the respective embodiments described above each form the configuration in which one each of the linear protrusions 21b, 22b, 62b and the grooves 21c, 22c, 62c on the vane end portion side, and the grooves 35b, 55b, 75b and the linear protrusions 35c, 55c, 75c on the coupling support member side is disposed, the present invention is not limited thereto.

The configurations of the coupling part structure for the vane and the jet engine according to the present invention are not limited to the above-mentioned embodiments.

EXPLANATION OF REFERENCE SIGNS

1 Jet engine
20 Guide vane (stationary vane)
21 Vane proximal end portion (vane end portion)
21a, 22a, 62a Joint surface
21b, 22b, 62b Linear protrusion
21c, 22c, 62c Groove
22 Vane distal end portion (vane end portion)
33, 53, 73 Coupling support member
34, 54, 74 A pair of divided pieces
35a, 55a, 75a End joint surface
35b, 55b, 75b Groove
35c, 55c, 75c Linear protrusion
36 Bolt
37 Nut
60 Rotor blade
62 Tip (vane distal end portion)

The invention claimed is:

1. A coupling part structure for a vane that constitutes a jet engine and is made of a composite material of thermosetting resin or thermoplastic resin and reinforcement fiber, the coupling part structure comprising a vane coupling part, wherein
    the vane coupling part includes a coupling support member placed therein, the coupling support member being made of metal and including a pair of divided pieces separated from each other, the pair of divided pieces being joined to an end portion of the vane from both sides in a vane thickness direction and each of the pair of divided pieces being directly attached to an attachment flange of a fan case or a fan frame of the jet engine,
    on an either one of respective end joint surfaces of the pair of divided pieces of the coupling support member, a linear protrusion is formed in an axis direction of the jet engine, and in the other end joint surface, a groove is formed in the axis direction of the jet engine to face the linear protrusion,
    the end portion of the vane is formed into a concavo-convex shape in a state with a constant vane thickness in a radial direction of the jet engine, the end portion of the vane has a groove that is engaged with the linear protrusion which is formed on the one end joint surface of either one of the pair of divided pieces, in either one joint surface of joint surfaces to the pair of divided pieces, and has a linear protrusion that is engaged with the groove which is formed in the end joint surface of the other one of the pair of divided pieces, on the other joint surface and at a back side position of the groove in the either one joint surface, and
    the end portion of the vane is held between the pair of divided pieces of the coupling support member, by fastening force that is applied to the pair of divided pieces of the coupling support member from both the sides in the vane thickness direction.

2. The coupling part structure for the vane according to claim 1, wherein an adhesive is interposed between the pair of divided pieces of the coupling support member and the end portion of the vane held between the pair of divided pieces.

3. The coupling part structure for the vane according to claim 2, wherein the vane is a stator vane of the jet engine.

4. A jet engine comprising the coupling part structure for the vane according to claim 2, as a coupling part structure for a vane constituting the jet engine.

5. The coupling part structure for the vane according to claim 1, wherein the vane is a stator vane of the jet engine.

6. A jet engine comprising the coupling part structure for the vane according to claim 5, as a coupling part structure for a vane constituting the jet engine.

7. A jet engine comprising the coupling part structure for the vane according to claim 1, as a coupling part structure for a vane constituting the jet engine.

* * * * *